United States Patent

Morrison

[15] 3,699,423
[45] Oct. 17, 1972

[54] D. C. TO A.C. CONVERTER WITH UNIQUE FEEDBACK DEMODULATION
[72] Inventor: Steven Morrison, Randallstown, Md.
[73] Assignee: The United States of America as represented by the Secretary of the Navy
[22] Filed: Dec. 29, 1971
[21] Appl. No.: 213,388

[52] U.S. Cl............321/8 R, 307/240, 330/9, 330/10
[51] Int. Cl............H02m, H03f
[58] Field of Search........330/9, 10; 321/8 R, 34, 46; 324/120; 307/240

[56] References Cited

UNITED STATES PATENTS 3,237,018  2/1966  Leger..............307/240 X
3,416,090  12/1968  Harrison...............330/9
3,419,784  12/1968  Winn..............321/8 R

OTHER PUBLICATIONS

National Semiconductor Corp. General Engineering Memo No. 10, "A Low Level Differential Chopper Amplifier," Oct. 29, 1962.

Primary Examiner—William H. Beha, Jr.
Attorney—R. S. Sciasia et al.

[57] ABSTRACT

An D.C. to A.C. converter where the output A.C. signals which are 180 degrees apart are rectified in an integrated chopper and applied to a differential amplifier with the D.C. input in order to minimize sources of error. The signal from the differential amplifier is modulated in a semi-conductor modulator and applied through another differential amplifier to the output.

6 Claims, 5 Drawing Figures

D. C. TO A.C. CONVERTER WITH UNIQUE FEEDBACK DEMODULATION

BACKGROUND OF THE INVENTION

The invention relates generally to a D.C. to A.C. converter and more particularly to a D.C. to A.C. converter with a unique feedback and modulation scheme.

Various types of converter circuits are known to the art for translating a D.C. signal to a chopped or A.C. signal having an amplitude proportional to the input signal and a frequency determined by the chopper or modulator.

The mechanical choppers or converters have been utilized but, it is desirable to avoid devices using mechanical parts in order to insure long term reliability and chop or modulate at higher frequency. Even in the preferred semi-conductor chopper circuits of a prior art have encountered various problems. These problems have included the coupling of a driver source to the signal to be controlled, the inability to eliminate inherently generated noise, and variations in the output due to variations of the circuit parameters and temperature. The use of isolation transformers for separation of temperature control potential from a signal being controlled, has been found to be expensive and bulky. Also other feedback techniques using common modes of subtraction have not truely eliminated internally generated noises.

SUMMARY OF THE INVENTION

In accordance with the present invention, two output signals, which are 180° apart, are synchronously demodulated in a common integrated chopper and applied as an inverted rectified signals to the input from a differential amplifier with the D.C. input signal. The output of the differential amplifier, which has an integrated feedback, is synchronizely modulated in a semi-conductor chopper whose outputs are fed to two differential amplifiers to produce the two output signals.

OBJECTS OF THE INVENTION

An object of the present invention is to provide a regulated A.C. reference supply wherein said regulation is better than 0.1 percent.

Another object is to provide an D.C. to A.C. converter which eliminates several sources of error through common mode subtraction.

A further object of the invention is the provision of demodulation by the use of an integrated chopper, or "INCH."

Still another object is to provide isolation of the A.C. chopping signal from the D.C. input by the use of semiconductor devices.

Other objects, advantages, and novel features of the present invention will become apparent from the following detailed description of the invention when considered in conjunction with the accompanying drawings.

DETAILED DESCRIPTION OF THE PREFERRED EMBODIMENT

Figure 1:
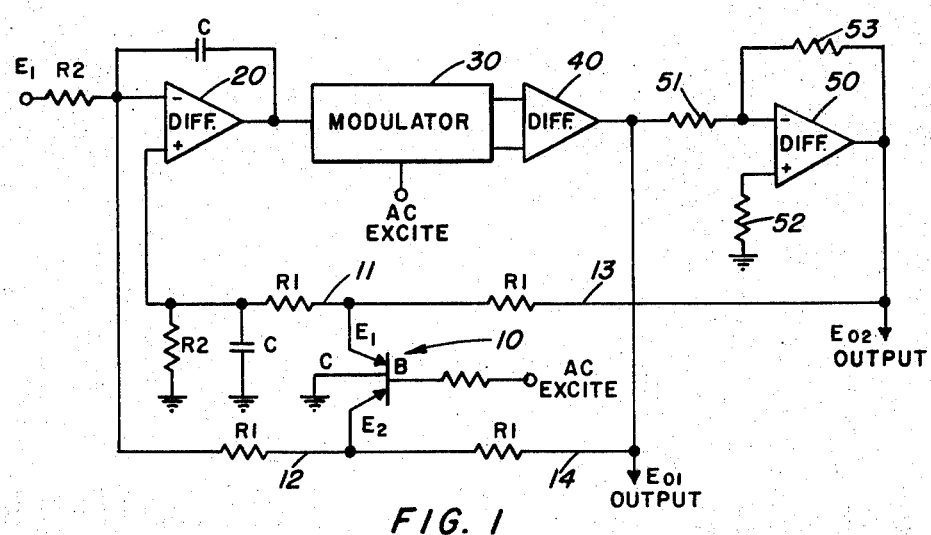
FIG. 1 is a schematic diagram of the D.C. to A.C. converter circuit in accordance with the present invention.

FIG. 1, which illustrates a preferred embodiment of the D.C. to A.C. converter, shows the output signals E01 and E02 being fedback through identical resistors R1 to the integrated chopper 10. Each of a pair of input lines 11, 12 to the differential amplifier 20 is connected to a respective emitter E1 and E2 of a double emitter solid state switch 10, which may be of the type sometimes referred to in the market place as an integrated chopper, or "INCH." This is essentially a double emitter transistor having a single base B and a single collector C, where a control current on the base controls the flow of current from the emitters $E_1$ and $E_2$ to collector C. The operation of this form of double emitter solid state switching apparatus is described more fully in a variety of handbooks available to the public. The base B of the solid state switch 10 is connected to a source of A.C. excitation. By grounding collector C, integrated chopper 10 functions in the inverted mode.

The demodulated or rectified signals are fed over lines 11 and 12 through filters to the input of differential amplifier 20. The input D.C. signal E1 to be modulated is also added to one of the inputs of the differential amplifier 20. The differential amplifier with integration feedback takes the difference between the average values of the input signal E1 and the fedback rectified signals from lines 11 and 12. The output of the differential amplifier is modulated in modulator 30 which is A.C. excited. The output of modulator 30, which is sinusoidal, is applied to differential amplifier 40. The output of differential amplifier 40, which is E01 is not only one of the signals fedback, but it is also fed to differential amplifier 50 to provide output E02 which is 180° off phase with E01. These two signals, E01 and E02, are within 0.01 percent of each other in amplitude because feedback resistor 53 and input resistor 51, of the final amplifier 50, are matched to that tolerance. These two resistors can be obtained in a single package.

Figure 3:
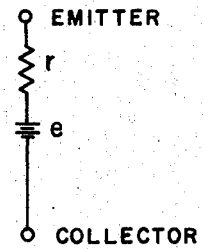
FIG. 3 is the equivalent circuit of a saturated transistor switch.

In the prior art, a single signal has been fedback through a transistor rectifier to a single one of the inputs of differential amplifier 20. FIG. 3 shows the equivalent circuit of a saturated transistor switch used in the prior art when it is turned fully on. r, is a saturated resistance from the emitter to the collector and e is the saturation off set voltage from the emitter to the collector. In the system according to the prior art, using a transistor switch, the sinusoidal output has a peak voltage equal to:

$$E_p = \frac{\frac{2\pi R1 E1}{R2} - \pi e}{1 - \frac{2r}{R1}} \quad (1)$$

where E1 is the D.C. input voltage. The term $e$ is the error due to the offset voltage of the transistor switch and the $1-(2r/R1)$ is the error due to the saturation resistance of the transistor.

Figure 2:
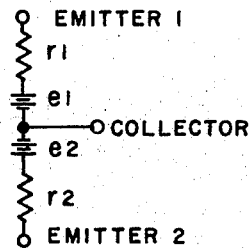
FIG. 2 is the equivalent circuit of a saturated integrated chopper.

FIG. 2 shows an equivalent circuit of the saturated integrated chopper of FIG. 1. $r1$, is a saturation resistance of emitter 1 to the collector, and $r2$ is a saturation resistance of the emitter 2 to the collector. $e1$ and $e2$ are the saturation offset voltages from the emitters to the collector. For the system of FIG. 1, the sinusoidal outputs have a peak value of:

$$E_p = \frac{\frac{\pi E1 R1}{R2} - \frac{\pi(e1-e2)}{2}}{1 - \frac{r1+r2}{R1} - 1/2\frac{(r2-r1)}{R1}} \times \frac{1}{1 + \frac{2R1}{R2}} \quad (2)$$

Since $r2 - r1$ is less than $r2 + r1$, equation 2 can be simplified to:

$$E_p = \frac{\frac{\pi E1 R1}{R2} - \frac{\pi(e1-e2)}{2}}{1 - \frac{r1+r2}{R1}} \quad (3)$$

The peak voltage of equation 3 can now be compared to peak voltage of equation 1. The effect due to saturation resistance is unchanged since twice the saturation resistance of a single transistor is equal to the saturation resistance from emitter to emitter of an integrated chopper. There is however, a large decrease in error due to offset voltage. For the system of FIG. 1, the error in output voltage due to offset voltage is $\pi (e1-e2)/2$ volts and, for the system of the prior art using a single transistor, this error according to Equation 1 is $\pi e$ volts. The 3N135 integrated chopper has a maximum offset voltage open $(e1-e2)$ of 100 microvolts, while the 2N4007 transistor of the prior art has a maximum offset voltage of 0.7 millivolts. The 2N4007 has essentially the same characteristics as a 3N135 when used only with a single emitter. Evaluation of the errors yields:

$$\pi(e1-e2)/2 = 0.157 \text{ millivolts}$$

$$\pi e = 2.2 \text{ millivolts}$$

hence the error due to offset has been reduced by a factor of $2.2/0.157 = 14$.

In operation, the sinusoidal output signals E01 and E02 are fedback over lines 13 and 14 to INCH 10 to be demodulated or rectified. Whenever the A.C. excitation signal is negative, the base of INCH 10 becomes negative, thus giving rise to a current flow between the base and the collector. This results in conduction from the emitters $E_1$ and $E_2$ of the switch 10 to the collector C, thereby almost completely shorting the input lines 13 and 14 to ground. When the A.C. excitation is no longer negative, the base B therefore rises above the threshold control potential with respect to collector C and the conduction between the emitters $E_1$, and $E_2$ and ground cease. At this time the impedance between the collectors $E_1$ and $E_2$ and ground is substantially an open circuit. Any leakage current with does flow from the emitters has negligible effect to the over all circuit since it is cancelled differentially due to the symmetry of the input circuits 11 and 12. The ability to maintain line to line chopping, even with one of differential amplifier 20 input being grounded, is possible because of the impedance of the filter network INCH 10, and the inputs to differential amplifier 20 effectively isolate the fedback signals E01 and E02 from being at the same potential as the grounded input along the line level. This isolation allows internally generated switching noise to appear as the common mode signal at the inputs to differential amplifier 20 and consequently rejected by said differential amplifier.

Figure 4:
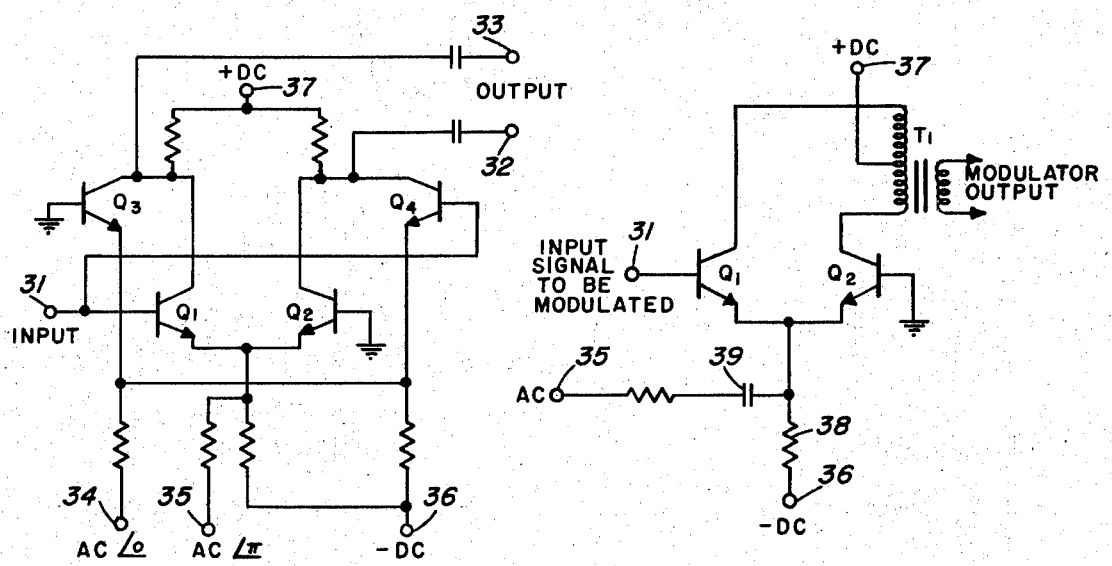
FIG. 4 is a schematic diagram of the modulator used in FIG. 1

Modulator 30 is shown in detail in FIG. 4. It consists of two half section modulators made up of transistors Q1 and Q2, and transistors Q3 and Q4. The sections are biased by A.C. voltage on terminals 34 and 35 and D.C. voltage on terminals 36 and 37. The input signal from differential amplifier 20 is applied at input 31 and the signal out of the modulator sections are on terminals 32 and 33 which are connected to differential amplifier 40 of FIG. 1.

Figure 5:
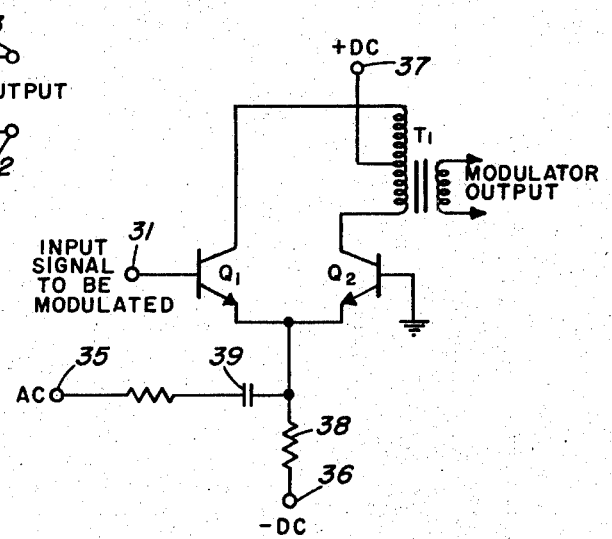
FIG. 5 is a half section of the modulator of FIG. 4.

The operation of the modulator is most easily understood by considering a half section of the basic circuit of FIG. 4 as shown in FIG. 5. Assume that the base of Q1 is at ground potential. The D.C. current through $Q_1$ and $Q_2$ are equal if the transistors are matched, or if unmatched they can be made equal by applying a small balancing voltage to one of the bases. The current into each emitter is then determined by resistor 38 and the D.C. supply. The transconductance of the transistors is directly proportional to individual emitter currents which, for the present, are equal. If a reference A.C. current of zero to peak amplitude less the D.C. current through resister 38 is coupled in through capacitor 39, the D.C. current through $Q_1$ and $Q_2$ will be modulated. Since the D.C. currents are equal, the A.C. currents are equal in both transistors. The A.C. currents are subtracted in transformer $T_1$ and being equal, no output will appear at terminals of $T_1$. If now an input signal is applied to the base of $Q_1$ causing the currents in $Q_1$ and $Q_2$ to be different, an A.C. output will appear at the terminals of $T_1$ proportional to the difference between the A.C. currents conducted by $Q_1$ and $Q_2$ resulting from their differences in transconductance. The phase of the output, whether 0° or 180°, is determined by which transistor conducts the most current. Since the A.C. currents through $Q_1$ and $Q_2$ are approximately sinusoids, their difference also are sinusoids. They can be made to approximate sinusoids more closely by decreasing their amplitude in relation to the D.C. current, thus obtaining any reduction in distortion required.

A signal on the base of $Q_1$ also causes a difference D.C. current to appear at the input to T, thus, the input signal is also amplified by this circuit. This undesired signal can be removed by either filtering or providing a cancelling signal by various means. As filters are undesirable, another half section, was added which is phased in such a way that the input signal cancelled while the desired difference signals added. In the modulator of the present invention, the difference signal is obtained by subtraction with an operational amplifier in preference to $T_1$. The operational amplifier also performs the required function of providing the device with a low impedance output.

The present invention has been found to be temperature stable. With tests at 20°C, 100°C, and −50°C, neither output, E01 and E02, changed more than 0.0825 percent from its 25°C value.

From the above description it has been shown that the present invention converts D.C. to A.C., where the internal errors of the electronics are reduced by a factor of 14. Also these internal errors are part of the common mode signal and therefore eliminated. The present invention provides two A.C. output signals 180° apart which are within 0.01 percent of each other in amplitude. The invention has also been shown to be totally temperature stable.

Obviously, many modifications and variations of the present invention are possible in light of the above teachings. It is therefore to be understood that within the scope of the appended claims, the invention may be practiced otherwise than as specifically described.

What is claimed is:

1. A D.C. to A.C. converter comprising:
   a differential amplifier having a single output and a pair of inputs;
   a D.C. input signal connected to one of said differential amplifier's inputs;
   a source of alternating current;
   a modulator connected to the output of said differential amplifier and said source of alternating current;
   output circuit means connected to said modulator to receive an A.C. signal therefrom and provide two A.C. signals as outputs;
   feedback means connecting said output circuit means and said differential amplifier for demodulating said two A.C. output signals and applying them to said pair of inputs of said differential amplifier; and
   wherein said D.C. input is converted to an alternating signal having an amplitude proportional to the magnitude of said D.C. signal and having the period of said source of alternating current.

2. A D.C. to A.C. converter according to claim 1, wherein said differential amplifier has an integrative feedback so that said differential amplifier produces an average value.

3. An D.C. to A.C. convertor according to claim 1, wherein said modular comprises two modulator sections;
   said alternating current source driving the two modulators 180° out of phase; and
   each modulator section providing a modulated output signal 180° out of phase with the other section.

4. An D.C. to A.C. converter according to claim 3, wherein said output circuit means includes a first differential amplifier with a pair of inputs;
   the two output of said modulator being applied to said first output differential amplifier's inputs; and
   whereby any portion of the signal appearing at said modulator input which is passed by said modulator is cancelled by said first output differential amplifier.

5. An D.C. to A.C. convertor according to claim 4, wherein said output circuit means also includes a second differential amplifier with one input grounded;
   a feedback resistor connected between the output and the other input;
   said other input receives the signal from the first output differential amplifier through a resistor; and
   said feedback resistor and said input resistor are matched so that the signal out of said first output differential amplifier and the signal out of said second output differential amplifier are 180° out of phase and the amplitudes deviate by the tolerance of the matched resistors.

6. An D.C. to A.C. convertor according to claim 1, wherein:
   said two A.C. output signals are 180° out of phase;
   said feedback means comprises an integrated chopper having two emitters, a collector, and a base, said two A.C. output signals are connected to a respective emitter, said collector connected to ground and said base being connected to said source of alternating current; and
   whereby said integrated chopper demodulates said two A.C. output signals, and applies them as inputs to a respective input of said differential amplifier.

* * * * *